United States Patent Office.

MARTINUS B. KIMM, OF GRAND RAPIDS, MICHIGAN, ASSIGNOR TO HIMSELF AND GEORGE G. STEKETEE, OF SAME PLACE.

Letters Patent No. 100,043, dated February 22, 1870.

IMPROVED COMPOUND TO REMOVE GREASE FROM CLOTH, SILK, PAPER, &c.

The Schedule referred to in these Letters Patent and making part of the same

*Know all men by these presents:*

That I, MARTINUS B. KIMM, of the city of Grand Rapids, Kent county, Michigan, have invented a new and useful composition of matter called by me Kimm's Grease-Extractor; and I do declare the following to be a full, clear, and exact description thereof, and of the manner of making, compounding and using the same.

The nature of my invention consists in mixing carbonate of magnesia, benzine, *chromas plumbi, cyan ferri,* and alcohol, to form a powder for extracting grease and oil from paper, cloth, silk, velvet, merino, &c.

To enable others to make and use and compound my invention, I will proceed to describe the manner of mixing and compounding the same, giving the amount of the ingredients used, by weight.

To make one pound eight ounces and seven drams of my extracter, take sixteen ounces of carbonate of magnesia, four ounces benzine, two drams *chromas plumbi,* one dram *cyan ferri,* and one-half ounce alcohol, pulverize the solid ingredients, and then mix thoroughly and bottle in air-tight bottles for use.

For larger or smaller quantities, use the same ingredients in like proportion.

In using my invention first apply the same, it being in the form of powder, to a piece of paper sufficient to cover the oil or grease spot, then place the grease spot upon the powder and cover it with a like quantity of powder. After this is done lay some heavy weight upon it in order to press the whole together and keep the powder in its proper place. It should remain in this position until the grease or oil is extracted, which will commonly be in one or two days.

A much quicker and perhaps better way is to use a medium hot flat-iron as a weight, when only five or ten minutes will be required to complete the work.

This latter method should not be applied to velvet, and in all cases a sufficient quantity of powder should be used to cover all the grease in the spot from which it is to be taken.

Having described my invention,

What I claim to have invented, and desire to secure by Letters Patent, is—

A composition of matter to extract grease and oil from cloth, silk, velvet, paper, and other articles, made from the ingredients above named, compounded and prepared substantially as set forth.

In witness whereof I have hereunto set my hand and seal this 18th day of December, A. D. 1869.

MARTINUS B. KIMM. [L. S.]

Witnesses:
 EDWARD TAGGART,
 OMAR H. SIMONDS.